(12) United States Patent
Kurtz et al.

(10) Patent No.: US 12,546,953 B2
(45) Date of Patent: Feb. 10, 2026

(54) LENSED FIBER OPTIC FERRULE WITH SIMPLIFIED MOLDING

(71) Applicant: US Conec Ltd., Hickory, NC (US)

(72) Inventors: Daniel D. Kurtz, Huntersville, NC (US); Ke Wang, Waxhaw, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 18/460,651

(22) Filed: Sep. 4, 2023

(65) Prior Publication Data

US 2024/0019641 A1    Jan. 18, 2024

Related U.S. Application Data

(63) Continuation of application No. 17/768,414, filed as application No. PCT/US2020/058794 on Nov. 4, 2020, now Pat. No. 11,768,335.

(60) Provisional application No. 62/930,754, filed on Nov. 5, 2019.

(51) Int. Cl.
*G02B 6/38* (2006.01)
*G02B 6/32* (2006.01)

(52) U.S. Cl.
CPC .......... *G02B 6/3853* (2013.01); *G02B 6/327* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 5,446,810 A | | 8/1995 | Watanabe et al. |
| 5,815,621 A | * | 9/1998 | Sakai ................... G02B 6/3834 |
| | | | 264/1.24 |
| 6,012,852 A | | 1/2000 | Kadar-Kallen et al. |
| 6,377,743 B1 | | 4/2002 | Ueda et al. |
| 6,629,781 B2 | * | 10/2003 | Shigenaga ........... G02B 6/3839 |
| | | | 385/59 |
| 7,510,337 B2 | | 3/2009 | Takeda et al. |
| 9,091,822 B2 | | 7/2015 | DeMerritt et al. |
| 9,563,027 B2 | | 2/2017 | Childers et al. |
| 10,222,559 B2 | | 3/2019 | Nakama et al. |

(Continued)

FOREIGN PATENT DOCUMENTS

| | | |
|---|---|---|
| EP | 2998770 B1 | 10/2019 |
| JP | 20090258510 A | 11/2009 |

(Continued)

OTHER PUBLICATIONS

International Search Report, 3ages; Jul. 13, 2021.

(Continued)

*Primary Examiner* — Jerry Rahll
(74) *Attorney, Agent, or Firm* — Michael L Leetzow PLLC; Shubhrangshu Sengupta

(57) ABSTRACT

A fiber optic ferrule has a main body with a top surface and a bottom surface and extends between a front end and a back end. The front face includes a recessed portion with a plurality of optical lenses. The front face is configured to allow for the plurality of lenses to be on an angle relative to the front face and the fiber optic ferrule will have not any undercuts and allow the fiber optic ferrule to be ejected from a mold without engaging any portions of the mold.

20 Claims, 7 Drawing Sheets

(56) References Cited

U.S. PATENT DOCUMENTS

| | | |
|---|---|---|
| 10,564,365 B2 | 2/2020 | Maruyama et al. |
| 10,585,248 B2 | 3/2020 | Childers et al. |
| 10,620,387 B2 | 4/2020 | Bushnell et al. |
| 10,698,165 B2 | 6/2020 | Kadar-Kallen et al. |
| 10,962,725 B2 * | 3/2021 | Nakama ............... G02B 6/3847 |
| 11,125,950 B2 | 9/2021 | Watanabe et al. |
| 11,467,352 B2 | 10/2022 | Nakama et al. |
| 2011/0091167 A1 | 4/2011 | Nishimura |
| 2014/0133805 A1 | 5/2014 | Lin |
| 2015/0153518 A1 | 6/2015 | Kuo et al. |
| 2017/0146748 A1 | 5/2017 | Childers et al. |
| 2017/0160485 A1 | 6/2017 | Wan |
| 2017/0184793 A1 | 6/2017 | Watanabe et al. |
| 2018/0239092 A1 | 8/2018 | Childers et al. |
| 2018/0267251 A1 | 9/2018 | Childers |
| 2020/0103597 A1 | 4/2020 | Watanabe et al. |
| 2020/0264386 A1 | 8/2020 | Hodge et al. |
| 2022/0137303 A1 | 5/2022 | Otomitsu et al. |
| 2022/0146758 A1 | 5/2022 | Childers et al. |
| 2022/0276447 A1 * | 9/2022 | Cloud ................. G02B 6/3853 |
| 2022/0390684 A1 | 12/2022 | Kurtz et al. |

FOREIGN PATENT DOCUMENTS

| | | |
|---|---|---|
| JP | 7159791 B2 | 10/2022 |
| WO | 2018089286 A1 | 5/2018 |
| WO | 2018221717 A1 | 12/2018 |
| WO | 2020046965 A1 | 3/2020 |
| WO | 2020105258 A1 | 5/2020 |
| WO | 2020230363 A1 | 11/2020 |
| WO | 2021091949 A1 | 5/2021 |

OTHER PUBLICATIONS

Translation of WO2020105258 Previously submitted; 10 pages; Nakama et al.

Written Opinion of the ISA; Jul. 13, 2021; 7 pages.

* cited by examiner

LENSED FIBER OPTIC FERRULE WITH SIMPLIFIED MOLDING

REFERENCE TO RELATED CASES

This application claims priority under 35 U.S.C. § 119 (e) to U.S. provisional application No. 62/930,754 filed on Nov. 5, 2019, and under 35 U.S.C. § 120 to U.S. patent application Ser. No. 17/768,414, filed on Apr. 12, 2022, the contents of which are hereby incorporated by reference in their entirety.

Many types of single and multi-fiber fiber optic ferrules have integrated lenses and are available in the fiber optic connector industry today. These ferrules are made, at least partially, from an optically clear material. One such lensed ferrule is the PRIZM® MT® ferrule (or, PMT ferrule) provided by the Applicant. The PMT ferrule has lenses on its end-face. The lenses are positioned generally along the same plane that is orthogonal to the optical beam propagating therethrough. Molding the integral lenses and the ferrule requires two or more moving parts of the mold.

There is a need in the fiber optic connector industry to continuously improve the loss performance of current multi-fiber lensed ferrules. One limiting factor has its roots in the basic manufacturing (molding) process. Current molding processes for lensed ferrules have two or more moving parts that need to move prior to the finished ferrule being ejected from the mold. One of the moving parts of the mold is the mold core that creates the lenses that are adjacent to the end face of the ferrule. By requiring the lens core to move between every injection cycle, there is added uncertainty in controlling the location of the lens core relative to the rest of the mold. Since the ferrule is ejected in a direction perpendicular to the end face, it is advantageous to create a ferrule end face with a refractive lens that does not contain an undesirable undercut relative to the ejection direction.

Thus, there is a need for a to create a ferrule end face with a refractive lens that does not contain an undesirable undercut relative to the ejection direction. Applicant has developed a new type of a lensed ferrule, where the core that holds the lenses is fixed and does not move at the end of the molding process when the ferrule is ejected. Only the core that creates the guide pin holes or alignment features of the ferrule moves back and the ferrule is released from the mold.

SUMMARY OF THE INVENTION

The present invention is directed to a fiber optic ferrule for receiving a plurality of optical fibers in optical fiber support structures that includes a main body extending between a front end and rear end, the main body having a top surface and a bottom surface, the top surface and the bottom surface having different lengths between the front end and the rear end, a longitudinal axis extending between the front end and the rear end and parallel to the optical fiber support structures, a front face at the front end of the main body, the front face being non-perpendicular to the longitudinal axis, a recessed portion at the front face, a plurality of optical lenses within the recessed portion, wherein the front face has a plurality of points that lie on a plurality of vertical axes extending between the bottom surface and top surface, wherein each of the plurality of points are even with or rearward of the each of the plurality points thereabove.

In some embodiments, the plurality of optical lenses are in at least one row extending between side surfaces of the fiber optic ferrule.

In some embodiments, the length of the bottom surface is shorter than the length of the top surface.

In other embodiments, the fiber optic ferrule is ejected in a direction parallel to the vertical axes after a molding process.

In some embodiments, each of the plurality of points are even with or forward of the each of the plurality points therebelow.

In yet another aspect, there is a fiber optic ferrule for receiving a plurality of optical fibers in optical fiber support structures that includes a a main body extending between a front end and rear end, the main body having a top surface and a bottom surface, the top surface and the bottom surface having different lengths between the front end and the rear end, a longitudinal axis extending between the front end and the rear end and parallel to the optical fiber support structures, a front face at the front end of the main body, the front face being non-perpendicular to the longitudinal axis, a recessed portion at the front face, a plurality of optical lenses within the recessed portion, wherein the front face has a plurality of points that lie on a plurality of vertical axes extending between the bottom surface and top surface, wherein each of the plurality of points are even with or forward of the each of the plurality points therebelow.

And in yet another aspect, there is a provided a fiber optic ferrule for receiving a plurality of optical fibers in optical fiber support structures that includes a main body extending between a front end and rear end, the main body having a top surface and a bottom surface, the top surface being longer than the bottom surface, a longitudinal axis extending between the front end and the rear end and parallel to the optical fiber support structures, a front face at the front end of the main body, the front face being non-perpendicular to the longitudinal axis, a recessed portion at the front face, a plurality of optical lenses within the recessed portion, wherein the fiber optic ferrule is moved in a direction orthogonal to the top surface post molding.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
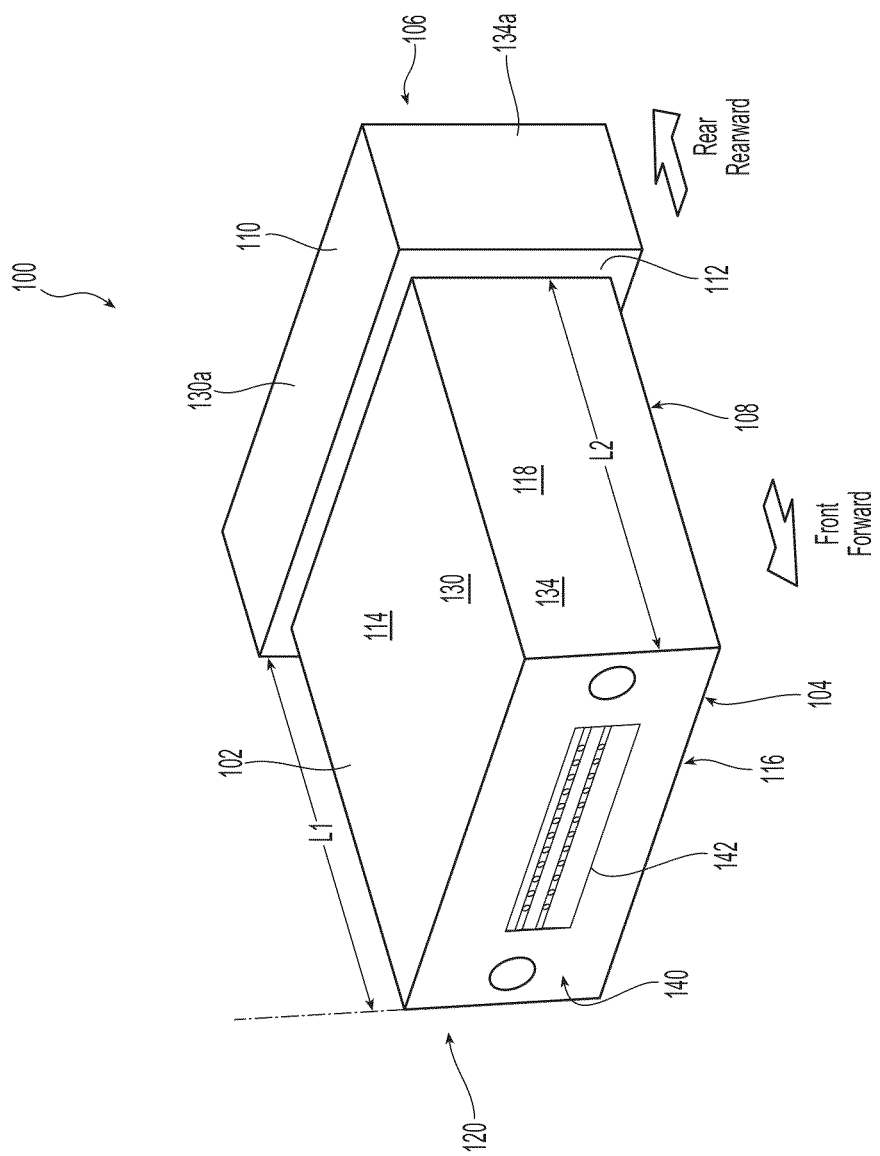
FIG. 1 is a perspective view of one embodiment of a fiber optic ferrule according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule or fiber optic connector. Each of the fiber optic ferrules will therefore have a front and rear, and the two fronts or forward portions of the fiber optic ferrules would engage one another. Thus, in FIG. 1, the "front" of the fiber optic ferrule is on the left side of FIG. 1 and "forward" is to the left and out of the page. "Rearward" or "back" is that part of the fiber optic connector that is on the right side of the page and "rearward" and "backward" is toward the right and into the page.

One embodiment of a fiber optic ferrule 100 according to the present invention is illustrated in FIGS. 1-7. The fiber optic ferrule 100 has a main body 102 extending between a front end 104 and a rear end 106, the main body 102 has a forward portion 108 and a rearward portion 110. The forward portion 108 is separated from the larger rearward portion 110 by a shoulder 112. The fiber optic ferrule 100 may not have the larger rearward portion 110, but whole main body 102 would have the same height and width as the forward portion 108.

The fiber optic ferrule 100 has a top 114, a bottom 116, and two sides 118, 120. The forward portion 108 has a top surface 130 and a bottom surface 132, the top surface 130 and the bottom surface 132 having lengths L1, L2, respectively. The lengths L1, L2 may be the different or, in another embodiment, they may be same. As illustrated in FIGS. 1 and 3, the lengths L1, L2 are measured between the front end 104 and the shoulder 112. If the fiber optic ferrule 100 were of a uniform height and width as noted above, then the lengths could be measured from the front end 104 to the rear end 106. The two sides 118, 120 each have a side surface 134, 136, respectively (see FIG. 2). It should be noted that the rearward portion 110 also has a top surface 130a, a bottom surface 132a, and side surfaces 134a, 136a, respectively. While the top surface 130 is illustrated as being the longer surface, it is also possible for the bottom surface 132 to be longer, so long as the main body has the appropriate configurations as described herein—thus it may only be a semantic change from "top" to "bottom."

There is a front face 140 positioned at the front end 104. Preferably the front face 140 has a recessed portion 142. There may also be alignment structures 144, which in one form takes the shape of guide pin holes. The alignment structures 144 may or may not open at the front face 140 within the recessed portion 142. The recessed portion 142 may be completely encircled by the front face 140, or the recessed portion 142 may extend to the top 114 or the bottom 116 or one of the sides 118, 120.

The main body 102 has an opening 150 that extends from the rear end 106 towards the front end 104 to receive optical fibers within the fiber optic ferrule 100. The main body 102 has optical fiber support structures 152 within the opening 150. The optical fiber support structures 152 could be micro-holes, v-shaped grooves or other configurations that support and align the optical fibers. The fiber optic ferrule 100 has a longitudinal axis A that is parallel to the optical fiber support structures 152 and the optical fibers that are inserted into the fiber optic ferrule. See FIGS. 3 and 4.

Turning to FIG. 3, the effect of the differing lengths L1, L2 is that the front face 104 makes an angle α other than 90° with the longitudinal axis A. Typically the angle α is about 84° but could be larger or smaller depending on a number of factors, for example, return loss, fiber mode, etc. It should be noted that the fiber optic ferrule 100 is usually mated with another ferrule that has the same configuration but is flipped 180° about the longitudinal axis so that the two front faces 104 are parallel to one another.

Turning to FIGS. 1-2 and 5-7, the recessed portion 142 has a number of different areas that stretch across at least a portion of the front face 140. As illustrated herein, there are two areas 160, 162 with a plurality of integral lenses 164 in rows. See FIGS. 2 and 6 in particular. It is also possible that there be more or fewer rows on integral lenses in the fiber optic ferrule 100. There is also an area 166 above the first area 160 of integral lenses 164. There is another area 168 that is between the two areas 160, 162 with the plurality of integral lenses 164. Finally, there is a third area 170 below the second area 162 of integral lenses 164.

For each row of integral lenses 164, each integral lens, or a portion thereof that is exposed, is at a tilt angle θ to the vertical/Y-axis. The term "integral" as applied to the integral lenses 164 refers to the lenses being molded together with the main body 102, and not being positioned separately onto the front face 140 or the recessed portion 142 thereof. For example and with reference to FIGS. 6 and 7, the top lens is shown at the tilt angle θ relative to the top lens tangent line. Likewise, the bottom lens is at the same tilt angle relative to the bottom lens tangent line. Typically, θ is approximately 22°.

Figure 2:
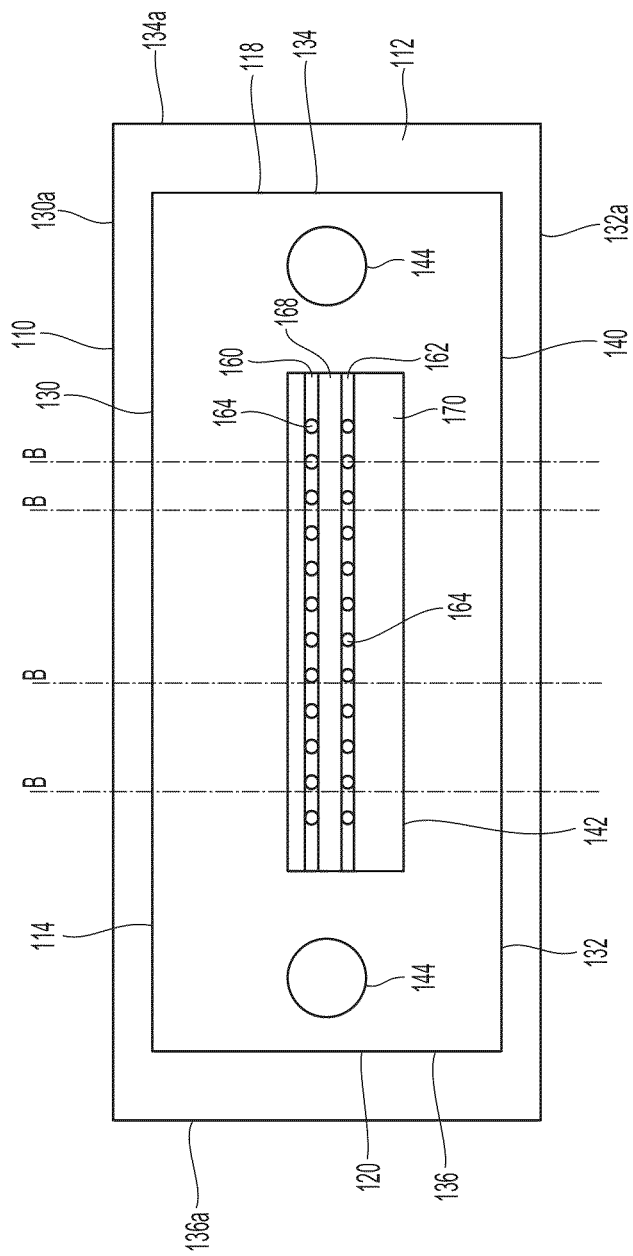
FIG. 2 is front view of the fiber optic ferrule in FIG. 1.
Figure 3:
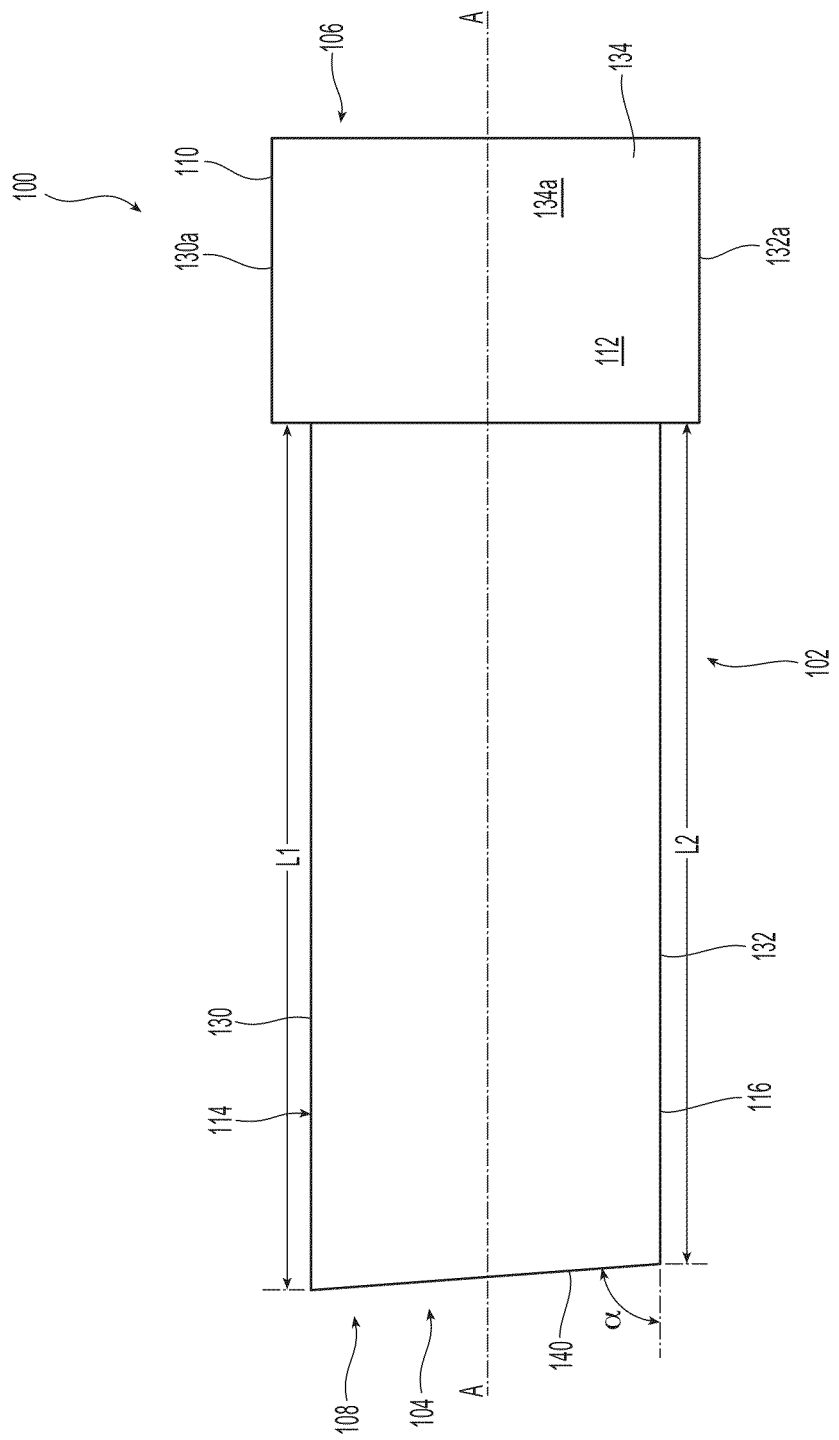
FIG. 3 is a left side elevation view of the fiber optic ferrule in FIG. 1.
Figure 4:
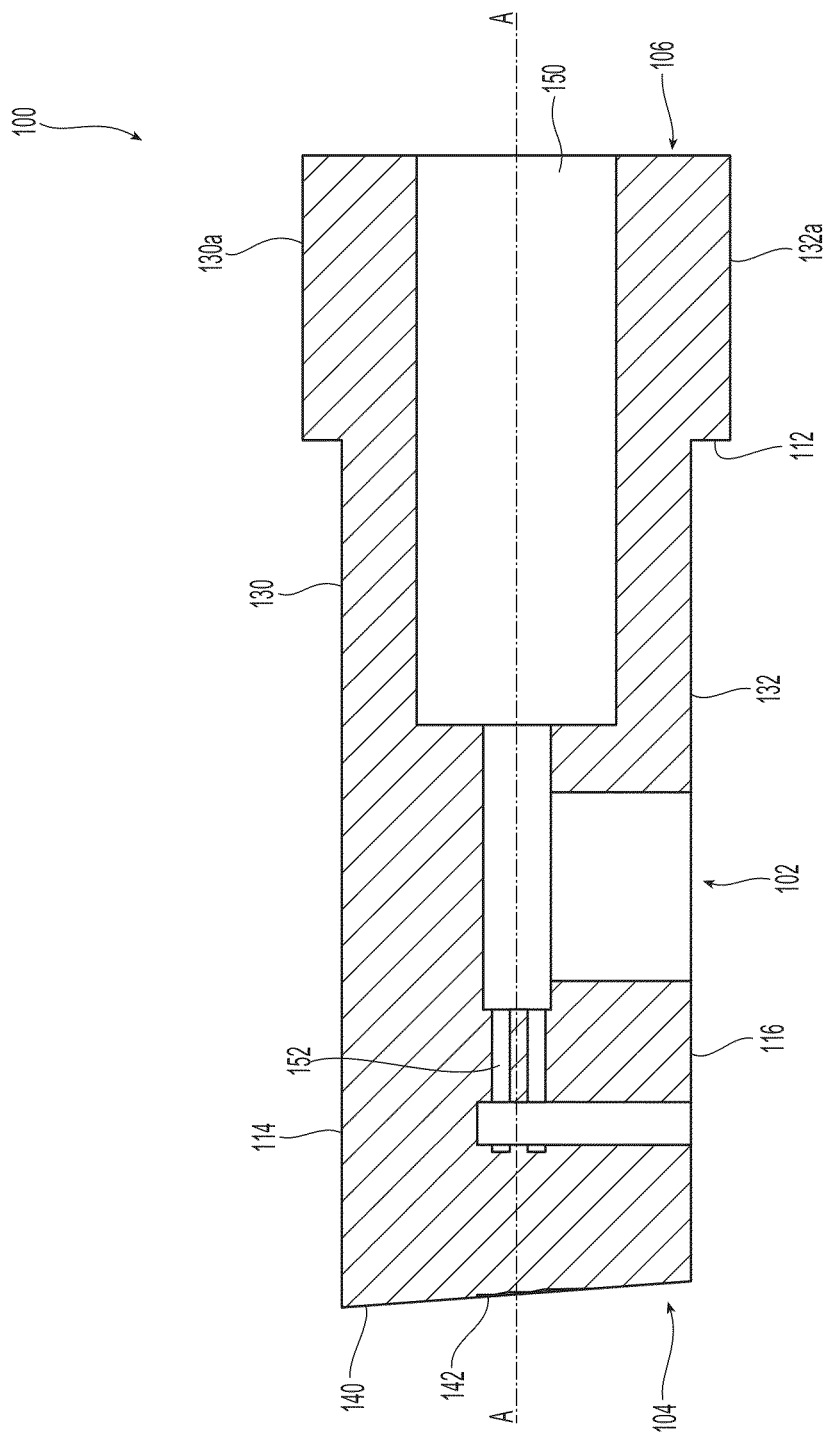
FIG. 4 is a left side elevation view of a cross-section of the fiber optic ferrule in FIG. 1.
Figure 5:
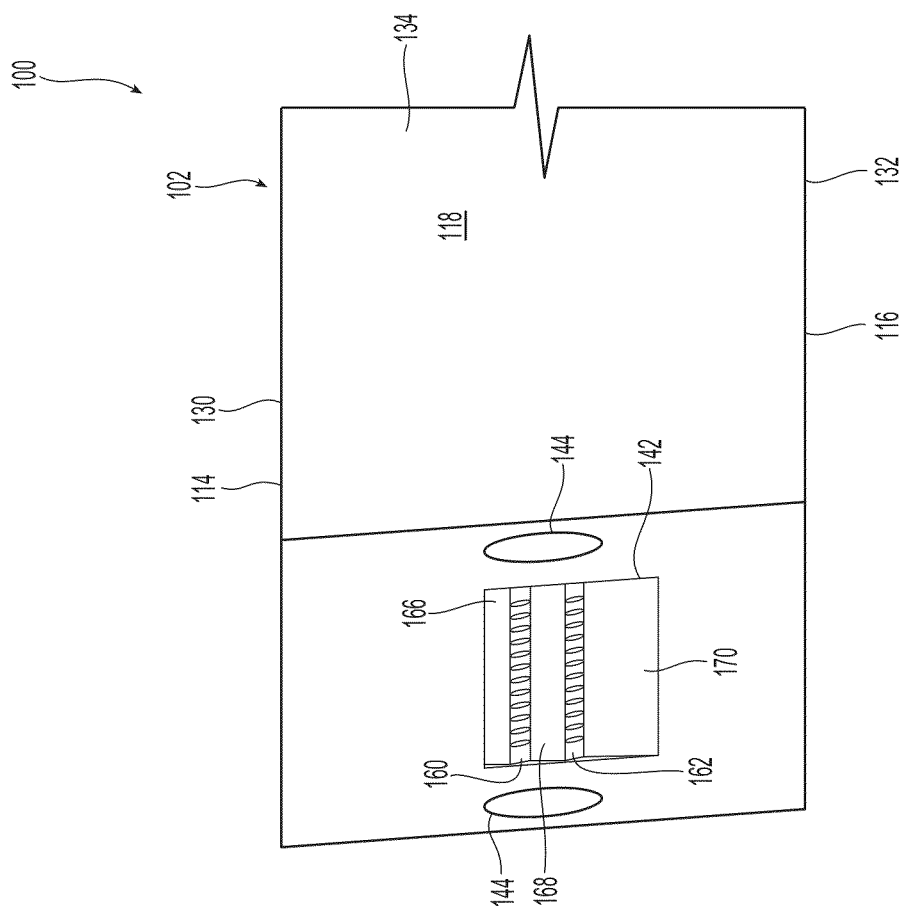
FIG. 5 is a perspective view of a portion of the front face of the fiber optic ferrule in FIG. 1.
Figure 6:
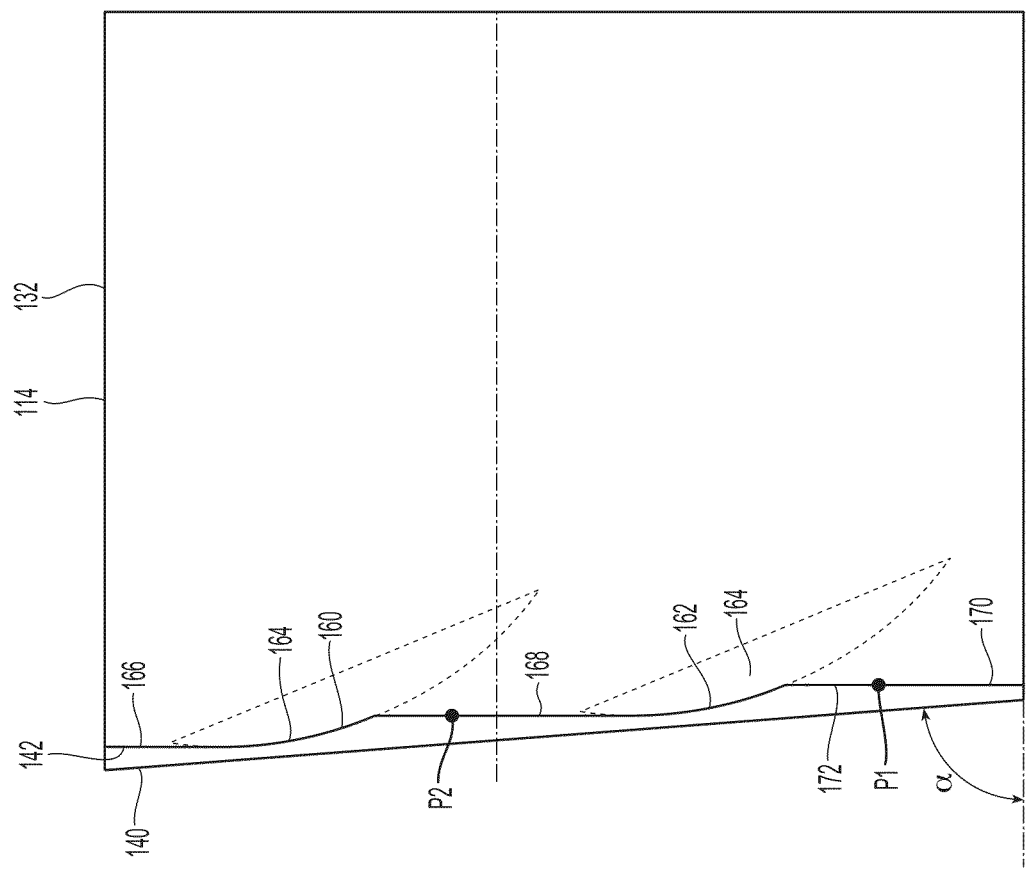
FIG. 6 is a schematic of a portion of the front of the fiber optic ferrule in FIG. 1 showing the points along a vertical axis.
Figure 7:
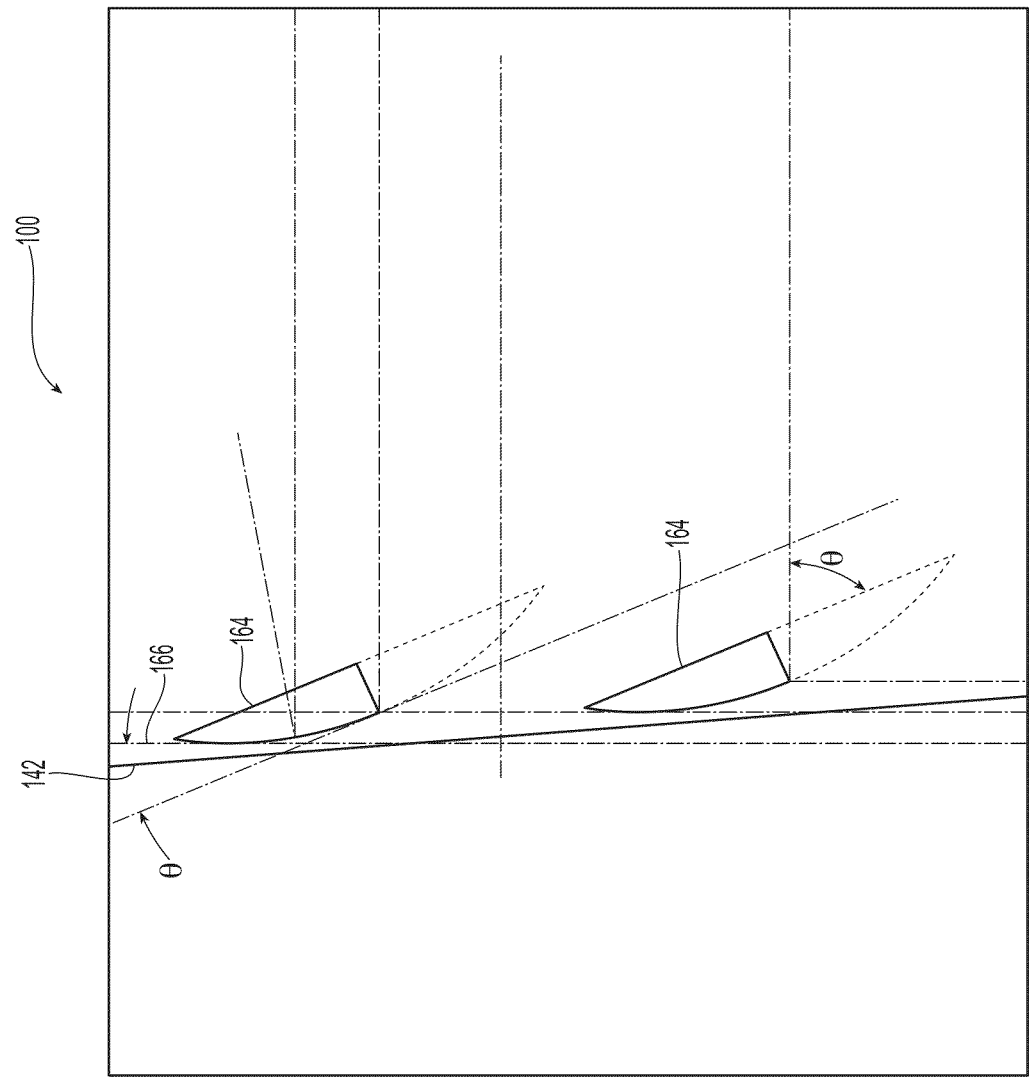
FIG. 7 is a schematic of a portion of the fiber optic ferrule in FIG. 1 illustrating the relationships of the components of the fiber optic ferrule.

With reference to FIG. 2, there are a plurality of vertical lines or axes B that can be used with reference to the front face 140. Each of these vertical axis B are perpendicular to the longitudinal axis A. Only four vertical lines or axes B are illustrated in FIG. 2. Indeed, there are theoretically an infinite number of vertical lines or axes B that could be placed on the front face 140 of the fiber optic ferrule 100. The front face 140, including the recessed portion 142, is made up of plurality of points 172 (indeed, also theoretically an infinite number of points). FIGS. 6 and 7 are representations from the left side of the fiber optic ferrule 100 of some of the points 172 on the front face of the fiber optic ferrule along one of the vertical axes B. This view allows for the description of the points 172 relative to the other points along one of the vertical axes B that is not possible to see in a front view image, i.e., FIG. 2.

The top 114 of the fiber optic ferrule 100 would be at the top of the page (or even beyond) as only a portion of the front face 140 is illustrated in FIGS. 6 and 7. It is the same consideration for the bottom 116, which is below where the figures are labeled. The solid dark line on the very left of the images is the front face 140, that makes the angle α with the top 114 and bottom 116. As can be understood (and with reference to FIGS. 3 and 4) the front face 140 at the top of the fiber optic ferrule 100 is the forward-most (the leftmost point in FIGS. 3 and 4) point on the fiber optic ferrule 100 along the vertical axis B. The next solid line demonstrate the points 172 that make up the recessed portion 142 and includes the areas 160, 162 with a plurality of integral lenses 164 and the spacing areas 166, 168 and 170 (and the front face 140 if the figure showed such). For each point 172 along the front face 140 and the recessed portion 142 and along the vertical axis B, the point directly above it is either even with or in front of (to the left in FIGS. 6 and 7) that point. For example a point P1 (a reference point) is illustrated in FIG. 6 as well as a second point P2. It is clear from FIG. 6, that P2 is either directly above or in front of (to the left) of P1. P2 is not behind or to the right of P1, eliminating any undercut on the front face 140 of the fiber optic ferrule 100. Conversely, using P2 as the first (reference) point, then P1 (a point below P2) is either directly below or behind P2. Because of this relationship of the points 172 along the vertical axes, there is no undercut on the front face 140 of the fiber optic ferrule 100. This relationship allows the fiber optic ferrule 100 to be ejected from mold in a vertical direction (perpendicular to the top surface 130) and upward in FIGS. 6 and 7 without removing or moving more of the mold—e.g., that part that forms the front face 140.

As illustrated in FIG. 7, the integral lenses 164 in area 160 are further to the left than the integral lenses 164 in the lower area 162. Again, this contributes to the elimination of the undercut in a typical fiber optic ferrule where, if the lenses are aligned on a vertical axis, there would be areas of undercut. The integral lenses 164 may be portions of a sphere, although other non-spherical refractive surfaces that are at a similar tilt as the integral lenses 164 could be used in another embodiment.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic ferrule for receiving a plurality of optical fibers in optical fiber support structures comprising:
    a main body extending between a front end and rear end, the main body having a top surface and a bottom surface, and two side surfaces joining the top surface and the bottom surface, with the optical fiber support structures at least partially disposed within the main body;
    a longitudinal axis extending between the front end and the rear end and parallel to the optical fiber support structures;
    a front face at the front end of the main body;
    a recessed portion at the front face being at a non-perpendicular angle to the longitudinal axis; and
    a plurality of optical lenses within the recessed portion, wherein the recessed portion has a plurality of points on a surface thereof and every one of the plurality of points on the surface, including every point on the plurality of optical lenses in the recessed portion is even with or rearward of the each of the plurality points thereabove in a direction perpendicular to the longitudinal axis.

2. The fiber-optic ferrule according to claim 1, the top surface and the bottom surface having different lengths between the front end and the rear end.

3. The fiber-optic ferrule according to claim 1, the top surface and the bottom surface having a same length between the front end and the rear end.

4. The fiber-optic ferrule according to claim 1, the front face being non-perpendicular to the longitudinal axis.

5. The fiber-optic ferrule according to claim 1, wherein the plurality of optical lenses are integral lenses.

6. The fiber-optic ferrule according to claim 5, wherein the plurality of optical lenses are portions of a sphere.

7. The fiber optic ferrule according to claim 5, wherein the plurality of optical lenses are non-spherical.

8. The fiber-optic ferrule according to claim 1, wherein each of the plurality of optical fibers have respective ends at a vertical opening within the main body, the vertical opening extending downwardly towards the bottom surface.

9. The fiber optic ferrule according to claim 1, wherein the plurality of optical lenses are in at least one row extending between side surfaces of the fiber optic ferrule.

10. The fiber optic ferrule according to claim 1, wherein the plurality of optical lenses are in at least two rows.

11. The fiber optic ferrule according to claim 1, wherein the fiber optic ferrule is ejected in a direction parallel to a vertical axis between the top surface and the bottom surface after a molding process, the vertical axis is perpendicular to the longitudinal axis.

12. The fiber optic ferrule according to claim 1, wherein each of the plurality of optical lenses is offset from the longitudinal axis by an angle θ.

13. A fiber optic ferrule for receiving a plurality of optical fibers in respective optical fiber support structures comprising:
    a main body extending between a front end and rear end, the main body having a top surface and a bottom surface and an opening at the rear end to receive the plurality of optical fibers respectively in the respective optical fiber support structures, the top surface and the bottom surface having different lengths between the front end and the rear end;
    a longitudinal axis extending between the front end and the rear end and parallel to the optical fiber support structures;
    a front face at the front end of the main body;
    a recessed portion at the front face; and
    a plurality of optical lenses within the recessed portion, wherein the recessed portion has a plurality of points on a surface thereof and that lie on a plurality of vertical axes extending between the bottom surface and top surface, wherein each of the plurality of points are even with or forward of the each of the plurality of points therebelow.

14. The fiber optic ferrule according to claim 13, wherein the plurality of optical lenses are in at least one row extending between side surfaces of the fiber optic ferrule.

15. The fiber optic ferrule according to claim 13, wherein the plurality of optical lenses are in at least two rows.

16. The fiber optic ferrule according to claim 13, wherein a length of the bottom surface is shorter than a length of the top surface.

17. The fiber optic ferrule according to claim 13, wherein a length of the bottom surface is longer than a length of the top surface.

18. The fiber optic ferrule according to claim 13, wherein the fiber optic ferrule is ejected from a mold in a direction parallel to the vertical axes.

19. The fiber-optic ferrule according to claim 13, further comprising:
    a vertical opening within the main body forward of each of the plurality of optical fibers in the optical fiber support structures, the vertical opening extending downwardly towards the bottom surface.

20. A fiber optic ferrule for receiving a plurality of optical fibers in optical fiber support structures comprising:
    a main body extending between a front end and rear end, the main body having a top surface and a bottom surface, the top surface having a different length than the bottom surface, the bottom surface having an opening extending partially into the main body forward of the optical fiber support structures;

a longitudinal axis extending between the front end and the rear end and parallel to the optical fiber support structures;
a front face at the front end of the main body;
a recessed portion at the front face; and
a plurality of optical lenses within the recessed portion arranged at an angle relative to the longitudinal axis,
wherein the fiber optic ferrule is moved in a direction orthogonal to the top surface post molding.

* * * * *